(12) United States Patent
Kohsaka et al.

(10) Patent No.: US 10,545,277 B2
(45) Date of Patent: Jan. 28, 2020

(54) DISPLAY DEVICE

(71) Applicant: SHARP KABUSHIKI KAISHA, Sakai, Osaka (JP)

(72) Inventors: Nozomu Kohsaka, Sakai (JP); Kohichi Aso, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/362,256

(22) Filed: Mar. 22, 2019

(65) Prior Publication Data

US 2019/0302342 A1 Oct. 3, 2019

(30) Foreign Application Priority Data

Apr. 2, 2018 (JP) .................. 2018-070724

(51) Int. Cl.
*G02B 6/34* (2006.01)
*G02B 6/00* (2006.01)
*F21V 8/00* (2006.01)

(52) U.S. Cl.
CPC ......... *G02B 6/0045* (2013.01); *G02B 6/0091* (2013.01)

(58) Field of Classification Search
CPC .. G02B 6/0016; G02B 6/0038; G02B 6/0045; G02B 6/0051; G02B 6/0021; G02B 6/0055
USPC ....................................... 362/611
See application file for complete search history.

(56) References Cited

U.S. PATENT DOCUMENTS

| | | | |
|---|---|---|---|
| 10,267,976 B1* | 4/2019 | Zheng ................. | G02B 6/0045 |
| 2012/0140513 A1* | 6/2012 | Shibata ............... | G02B 6/0035 362/602 |
| 2017/0052309 A1* | 2/2017 | Chen .................... | G02B 6/0058 |
| 2017/0153487 A1 | 6/2017 | Kim | |
| 2017/0336553 A1* | 11/2017 | Yuki .................... | G02B 6/0031 |
| 2019/0219756 A1* | 7/2019 | Kawano ................ | B60K 35/00 |
| 2019/0227218 A1* | 7/2019 | Kawano ............... | G02B 6/0051 |

FOREIGN PATENT DOCUMENTS

| | | |
|---|---|---|
| JP | 2017-102452 A | 6/2017 |
| WO | 2017/061312 A1 | 4/2017 |

* cited by examiner

*Primary Examiner* — Karabi Guharay
(74) *Attorney, Agent, or Firm* — ScienBiziP, P.C.

(57) ABSTRACT

A display device includes a display element having a display area, a light source, and a light guide element. The light guide element includes a light incident surface that receives incoming light from the light source, an opposite end face opposite to the light incident surface, a light exit surface that emits the light toward the display element, and an opposite plate surface opposite to the light exit surface. The light guide element has a through-hole penetrating the light guide element from the light exit surface to the opposite plate surface, the through-hole corresponding in location to the display area. In an adjacent area adjacent to the opposite end face, a light reflection portion having a reflection surface is disposed, the reflection surface being serrated in a plan view and reflecting light guided by the light guide element to the opposite end face, toward the through-hole.

7 Claims, 9 Drawing Sheets

DISPLAY DEVICE

CROSS REFERENCE TO RELATED APPLICATION

This application claims priority from Japanese Patent Application No. 2018-070724 filed on Apr. 2, 2018. The entire contents of the priority application are incorporated herein by reference.

TECHNICAL FIELD

The technology described herein relates to a display device, and relates particularly to a display device having a through-hole formed on a part of a display area.

BACKGROUND

A display device having a through-hole formed on a part of a display area is described in Patent Documents 1 and 2. This display device uses an edge-type backlight, which has a through-hole formed at a location corresponding to the location of a display area. According to the display device, luminance irregularity around the through-hole can be reduced.
[Patent document 1] WO 2017/061312
[Patent Document 2] Japanese Unexamined Patent Application Publication No. 2017-102452

In an ordinary backlight having a through-hole, as shown in FIG. 9, light L1 emitted from light sources 81 is reflected on the end face of a through-hole 83. As a result, light from the light sources 81 hardly reaches an area 70 located opposite to the light sources 81 with respect to the through-hole 83. This makes the area 70 darker than an area near the light source 81. Meanwhile, light L2 from the light source 81 propagates to an area around the area 70 and therefore gives the area 75 luminance equal to the luminance of the area near the light source 81. In this manner, this backlight poses a problem that the luminance of the area 70 becomes lower than the luminance of the area 75 to create luminance irregularity. This problem occurs particularly in a case where the light sources 81 are arranged on one side of a light guide element 82.

SUMMARY

The technology described herein was made in view of the above circumstances. An object is to provide a display device configured to reduce luminance irregularity between an area located opposite to light sources with respect to a through-hole and an area other than the above area.

A display device according to an aspect of the technology described herein includes a display element having a display area; a light source; and a light guide element. The light guide element includes a light incident surface that is an end face facing the light source, the end face receiving incoming light from the light source; an opposite end face located opposite to the light incident surface; a light exit surface that is a plate surface through which the light exits toward the display element; and an opposite plate surface located opposite to the light exit surface. The light guide element has a through-hole penetrating the light guide element from the light exit surface to the opposite plate surface, the through-hole is formed at a location corresponding to a location of the display area. In an adjacent area adjacent to the opposite end face, a light reflection portion having a reflection surface is disposed, the reflection surface is serrated in a plan view and reflects light guided by the light guide element to the opposite end face toward the through-hole. The adjacent area adjacent to the opposite end face includes the opposite end face itself and an area around the opposite end face.

According to the display device according to an aspect of the technology described herein, luminance irregularity between the area located opposite to the light sources with respect to the through-hole and an area other than the area 70 can be reduced.

DETAILED DESCRIPTION

First Embodiment

A first embodiment will be described in detail with reference to FIGS. 1 to 4.

Figure 1:
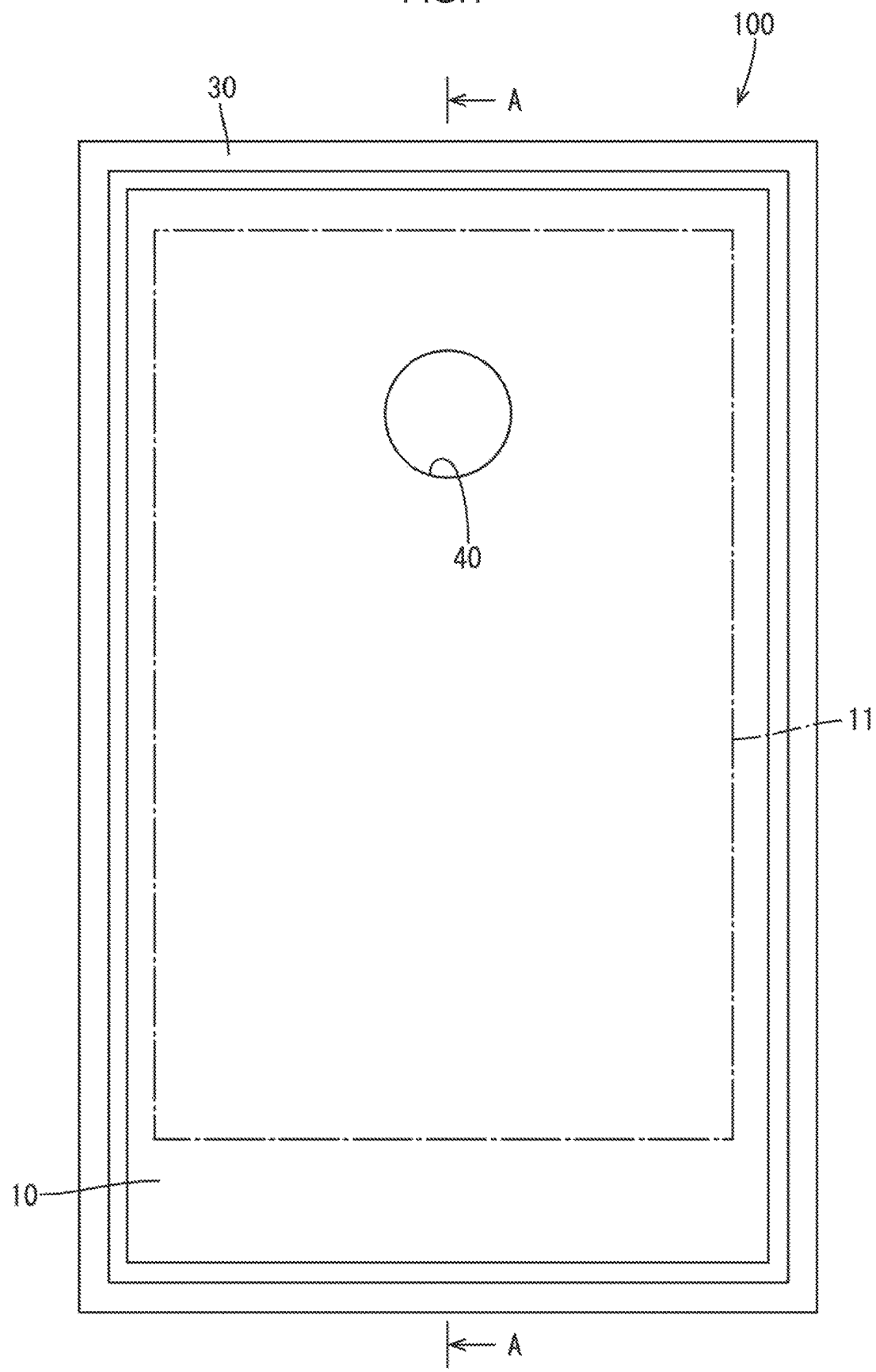
FIG. 1 is a top view schematically showing a liquid crystal display device according to a first embodiment.
Figure 2:
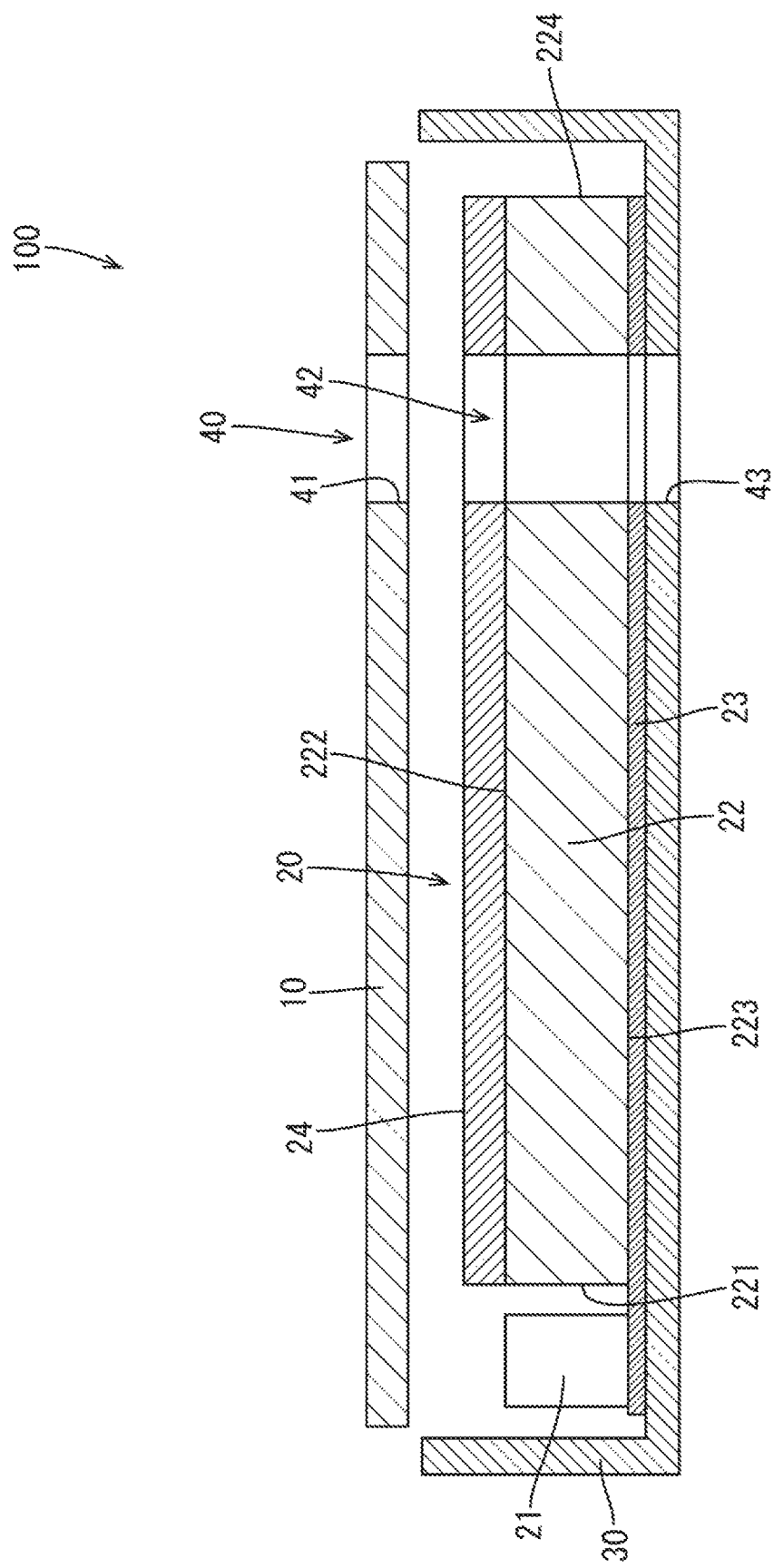
FIG. 2 is a sectional view of the liquid crystal display device that is taken along an A-A line shown in FIG. 1.

FIG. 1 is a top view schematically showing a liquid crystal display device (display device) according to the first embodiment. FIG. 2 is a sectional view of the liquid crystal display device that is taken along an A-A line shown in FIG. 1.

A liquid crystal display device 100 includes a liquid crystal panel (display element) 10, a backlit unit 20, and a frame 30 in which the liquid crystal panel 10 and the backlight unit 20 are housed. The liquid crystal display device 100 is used as a display device incorporated in smartphones, watches, car speed meters, and the like.

The liquid crystal panel 10 includes a display area 11 in which an image or the like is displayed, and a non-display area which is formed around the display area 11 and in which an image or the like is not displayed. The display area 11 of the liquid crystal panel 10 has a panel through-hole (through-hole) 41 penetrating the liquid crystal panel 10 in the direction of its thickness.

The backlight unit 20 is of a structure formed by stacking a reflection sheet 13, a light guide plate (light guide element) 22, and an optical sheet 24, such as a lens sheet and a diffusion sheet, in order. The backlight unit 20 has a unit through-hole 42 penetrating the backlight unit 20 in the direction of its thickness.

The backlight unit 20 further includes light sources 21 disposed on an end face of the light guide plate 22. The light sources 21 are not limited to a specific type of light source. For example, LEDs or the like may be used as the light sources 21. The light guide plate 22 has an light incident surface 221 that receives incoming incident light from the light sources 21, a light exit surface 222 through which incident light exits toward the liquid crystal panel 10, an opposite plate surface 223 opposite to the light exit surface 222, and an opposite end face 224 opposite to the light incident surface 221. The light guide plate 22 is made of a material having high light transmittance. It is preferable, from the viewpoint of a reduction in the thickness and size of the liquid crystal display device, that a resin, such as acryl and polycarbonate, be used as the material of the light guide plate 22. The reflection sheet 23 is disposed on the opposite plate surface 223 of the light guide plate 22. The reflection sheet 23 reflects light coming out of the opposite plate surface 223, toward the light exit surface 222. The optical sheet 24 is disposed on the light exit surface 222 of the light guide plate 22. The optical sheet 24 diffuses or condenses light emitted from the light exit surface 222.

The frame 30 is formed into a box shape in which the liquid crystal panel 10 and the backlight unit 20 can be housed. The material of the frame 30 is not limited to a specific material. For example, a resin, such as polycarbonate, or a metal, such as aluminum, is used as the material of the frame 30. The frame 30 has a frame through-hole 43 formed on its bottom.

The panel through-hole 41, the unit through-hole 42, and the frame through-hole 43 make up a through-hole 40, in which a device, such as a CCD camera and an illuminance sensor, is fitted. A hand of a watch, a speed meter, or the like may also be inserted in the through-hole 40. The bore diameter and shape of the through-hole 40 are not limited to a specific bore diameter and shape, and may be determined properly in accordance with the size, shape, or the like of a device or hand fitted in the through-hole 40.

Figure 3:
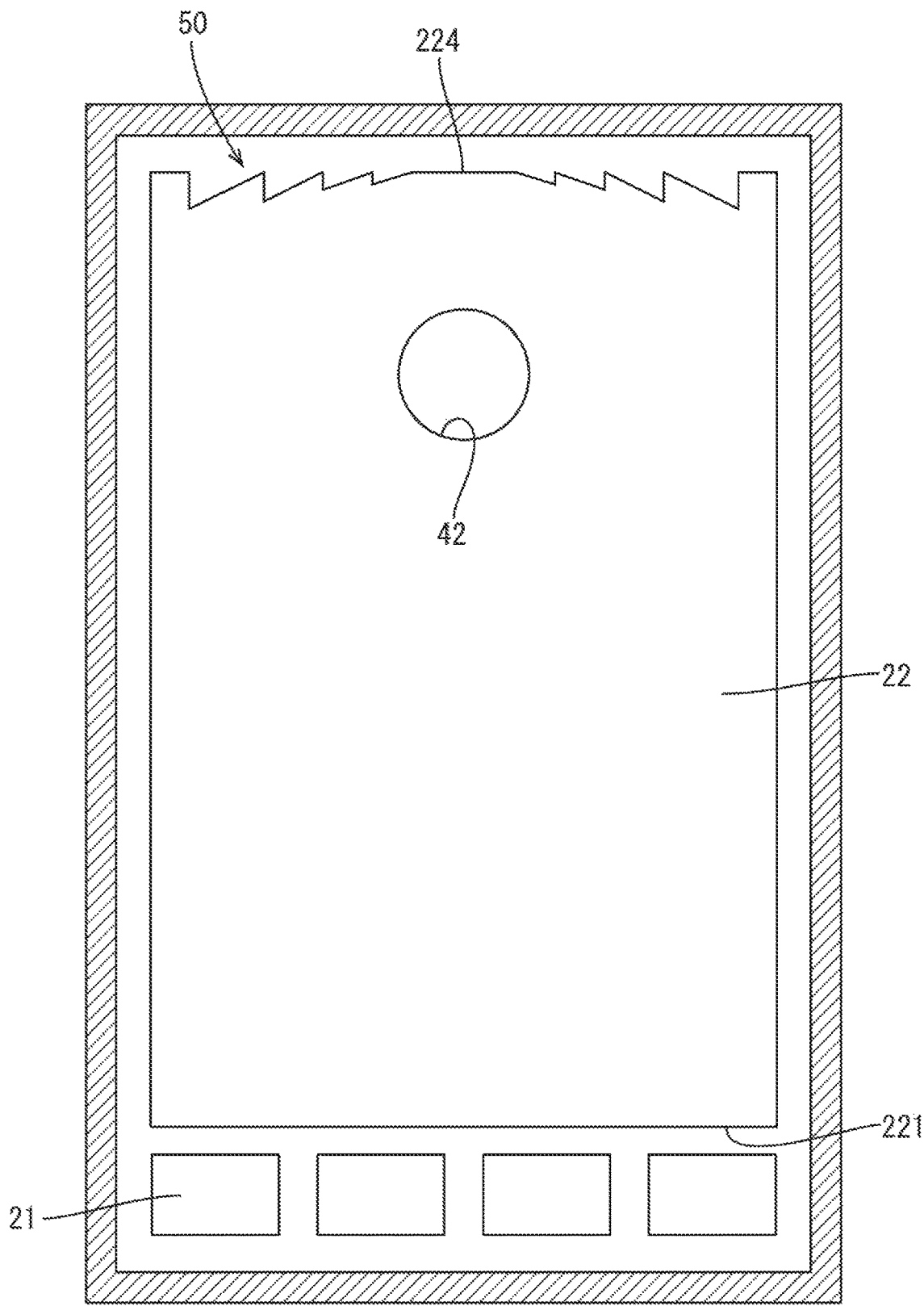
FIG. 3 is a top view schematically showing a backlight unit shown in FIG. 1.

FIG. 3 is a top view of the liquid crystal display device 100 of FIG. 1 from which the liquid crystal panel 10 and the optical sheet 24 are removed. As shown in FIG. 3, a light reflection portion 50 of a serrated shape in a plan view is formed on the opposite end face 224 which is one of the end faces of the light guide plate 22, the opposite end face 224 being located opposite to the incident surface 221.

Figure 4:
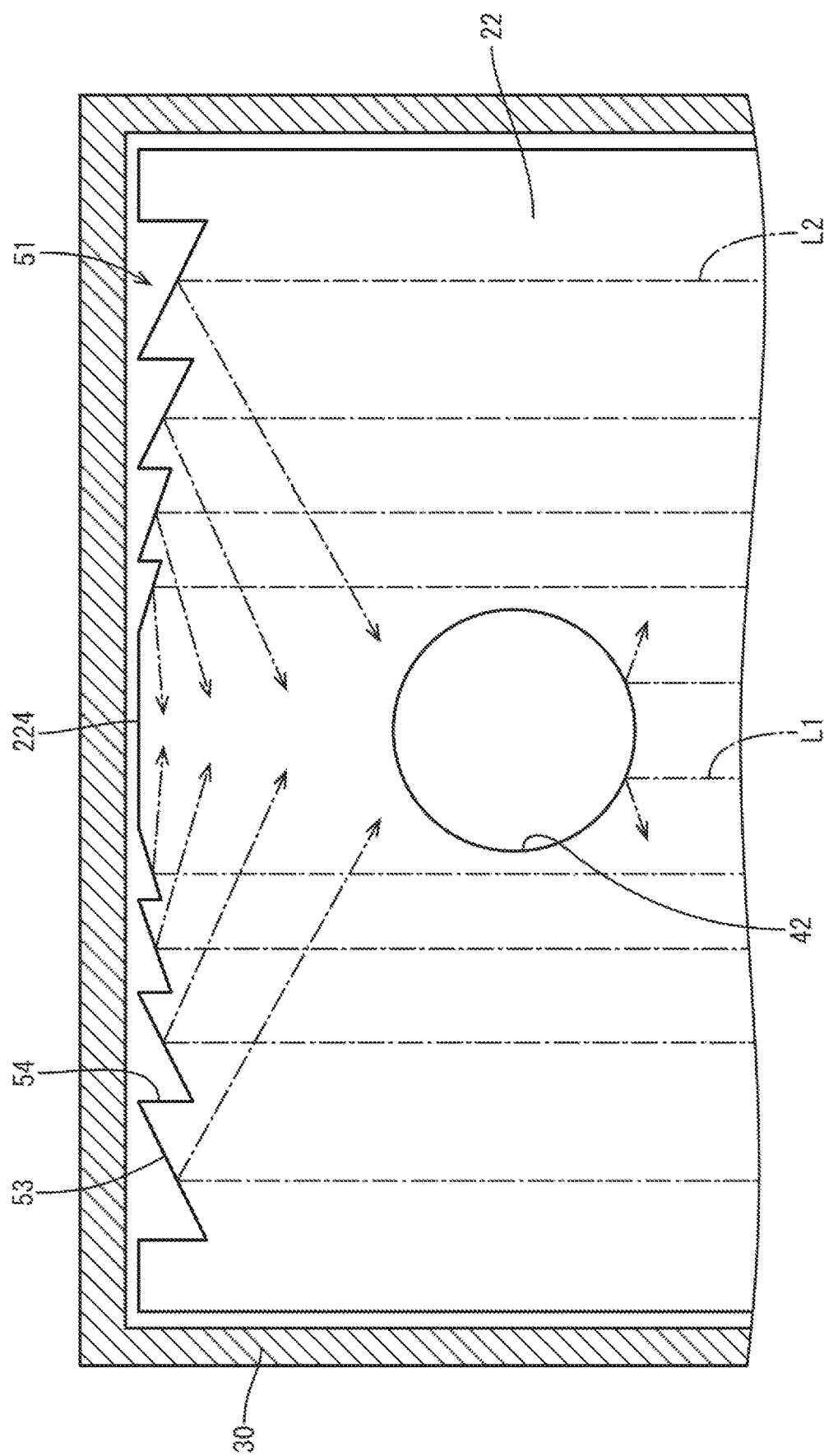
FIG. 4 is an enlarged diagrammatical view of an opposite end face of a light guide plate shown in FIG. 3.

The light reflection portion 50 will then be described in detail with reference to FIG. 4. FIG. 4 is an enlarged diagrammatical view of the opposite end face 224 shown in FIG. 3.

On the opposite end face 224 of the light guide plate 22, light guide plate light reflection portions 51 (light reflection portion 50) of a serrated shape in a plan view are formed. The light guide plate light reflection portions 51 have their respective reflection surfaces 53 that reflect light L2 from the light sources 21 toward an area 70 between the unit through-hole 42 and the opposite end face 224, and respective surfaces 54 extending vertically from the opposite end face 224. The reflection surfaces 53 are formed to be different in size and angel from each other to allow the reflection surfaces 53 to reflect light L2 toward the area 70. The sizes and angles of the reflection surfaces 53 are determined properly according to the size and location of the unit through-hole 42 and the number of the light sources 21.

In the same manner, the number and location of the light guide plate light reflection portions 51 are determined properly according to the size and location of the unit through-hole 42, the number of the light sources 21, the sizes and angles of the reflection surfaces 53, and the like.

In this manner, light L2 propagating to an area around the unit through-hole 42 is reflected by the reflection surfaces 53 of the light guide plate light reflection portions 51 to cause light L2 to proceed to the area 70 between the unit through-hole 42 and the opposite end face 224. As a result, light L2 reflected by the reflection surfaces 53 propagates to the area 70, thereby illuminates the area 70, to which light L1 emitted from the light sources 21 hardly propagates. Hence, the luminance of the area 70 is increased to the same level as the level of luminance of an area other than the area 70. This reduces luminance irregularity.

The reflection surfaces 53 may be coated with a reflective material with high reflectance, such as a reflection sheet and white paint.

In the present embodiment, the liquid crystal display device having one circular through-hole has been described. However, the unit through-hole is not limited in number and shape to the unit through-hole according to this embodiment. Several unit through-holes, therefore, may be provided. The unit through-hole may vary also in shape. For example, in a plan view, it may be an ellipse, or a polygon, such as a square and a rectangle, or a shape including curved part.

According to the present embodiment, the liquid crystal display device may have a configuration different from the configuration described above. Modifications of the liquid crystal display device will hereinafter be described. For convenience, members having the same functions as those of the members described in the above embodiment will be denoted by the same reference numerals and will not be described further.

(Modification A)

Figure 5:
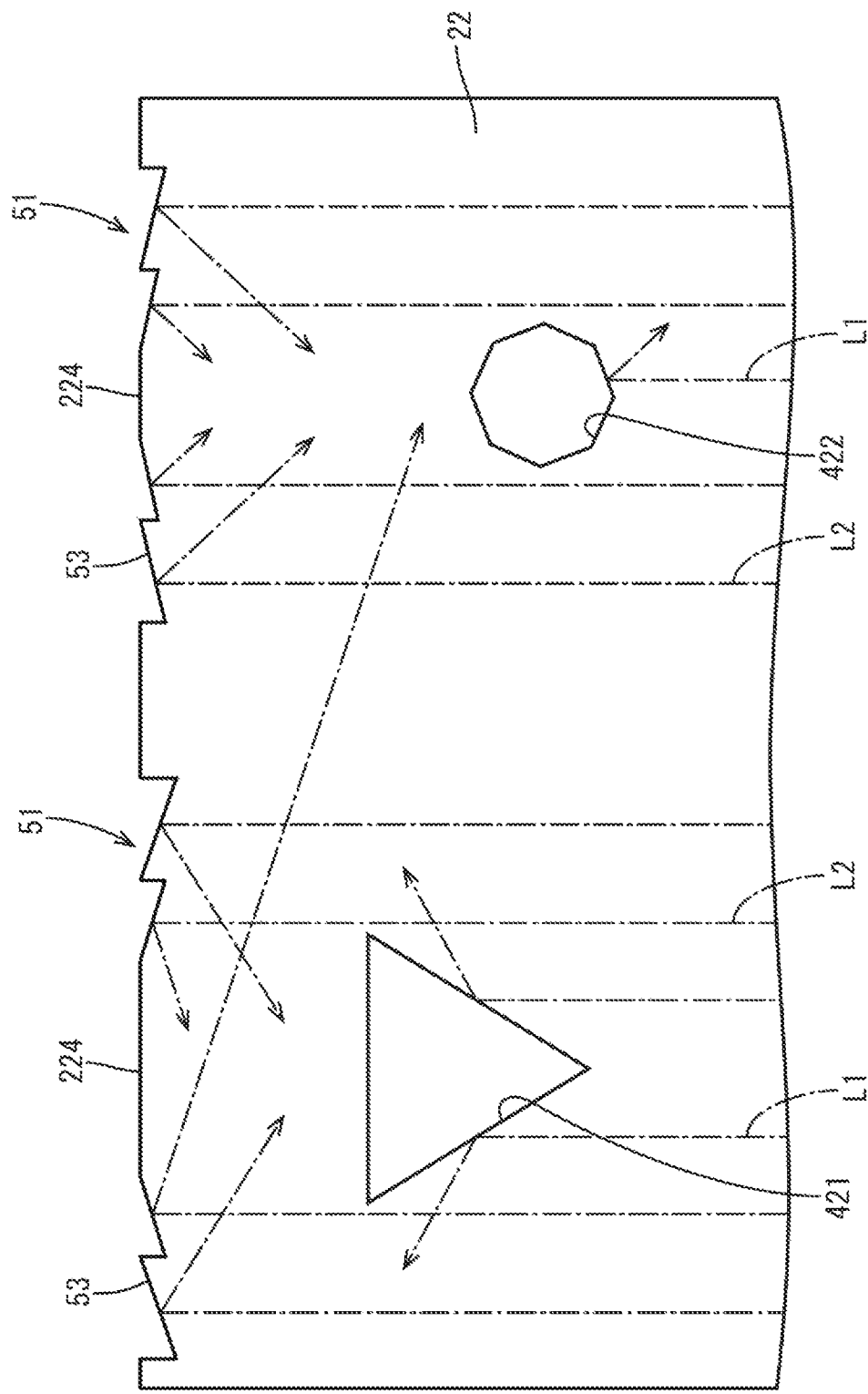
FIG. 5 is a diagrammatical view of a modification A of the first embodiment.

FIG. 5 is an enlarged diagrammatical view of the opposite end face 224 of the backlight unit 20 according to a modification A of the first embodiment.

As shown in FIG. 5, unit through-holes 421 and 422 different in shape from each other are arranged in a row on the light guide plate 22 in the direction of its short sides.

A liquid crystal display device configured in this manner is provided with the light guide plate light reflection portions 51 formed properly to reflect light L2 toward the area 70 between the unit through-hole 421 and the opposite end face 224 and toward the area 70 between the unit through-hole 422 and the opposite end face 224. This allows the liquid crystal display device of the modification A to offer the same effects as those offered by the liquid crystal display device according to the first embodiment.

(Modification B)

Figure 6:
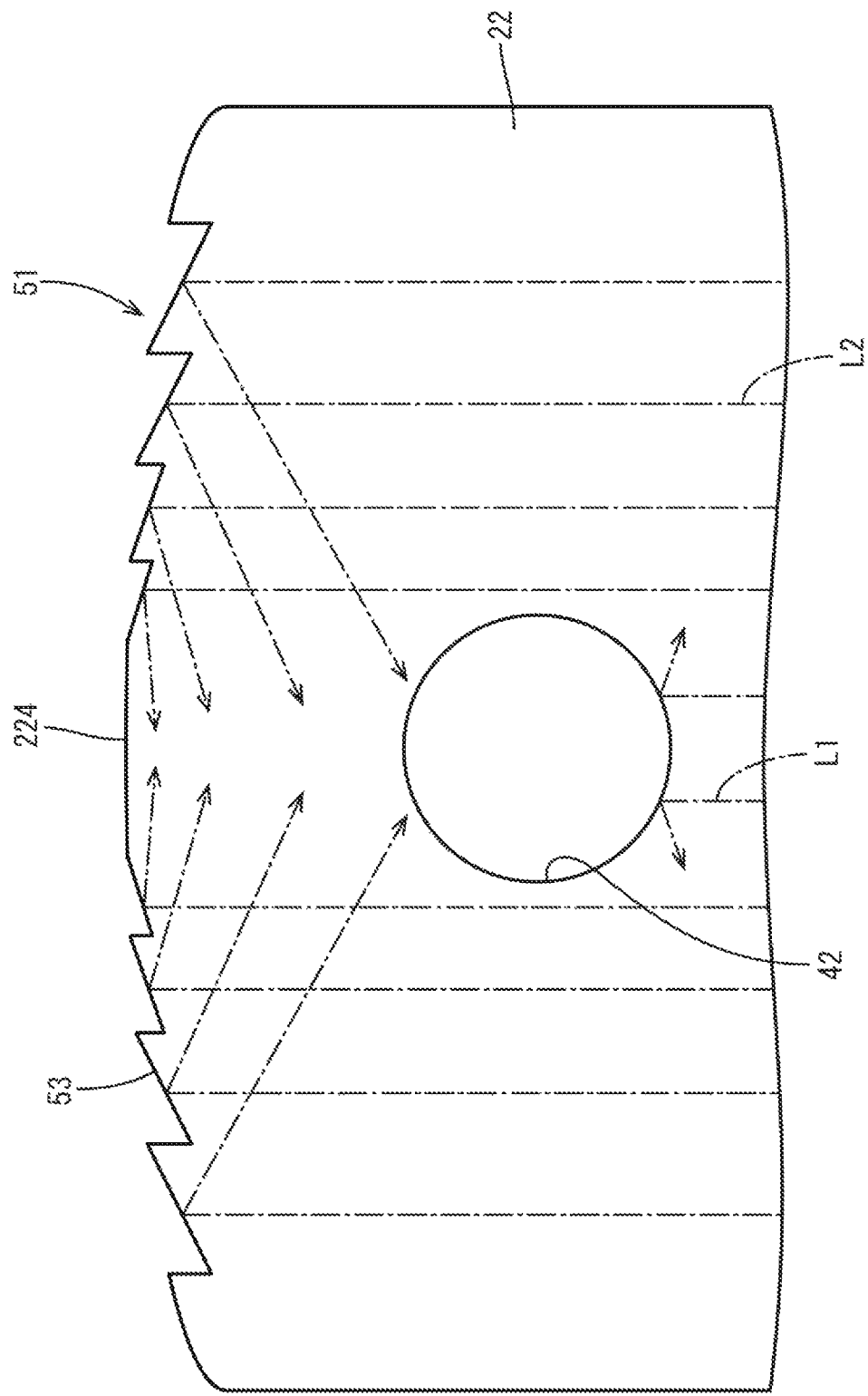
FIG. 6 is a diagrammatical view of a modification B of the first embodiment.

A modification B will then be described with reference to FIG. 6. FIG. 6 is an enlarged diagrammatical view of the opposite end face 224 of the backlight unit 20 according to the modification B.

As shown in FIG. 6, the opposite end face 224 of the light guide plate 22 is formed into a convex surface.

A liquid crystal display device configured in this manner is provided with the light guide plate light reflection portions 51 formed properly to reflect light L2 toward the area 70 between the unit through-hole 42 and the opposite end face 224. This allows the liquid crystal display device of the modification B to offer the same effects as offered by the liquid crystal display device according to the first embodiment.

In the modification B, the opposite end face of the light guide plate is formed into a convex surface. The opposite end face, however, may be formed into a doglegged shape having one apex or a shape including a curved part in a plan view, for example.

Second Embodiment

Another embodiment will be described in detail with reference to FIG. 7. For convenience, members having the same functions as those of the members described in the above embodiment will be denoted by the same reference numerals and will not be described further.

Figure 7:
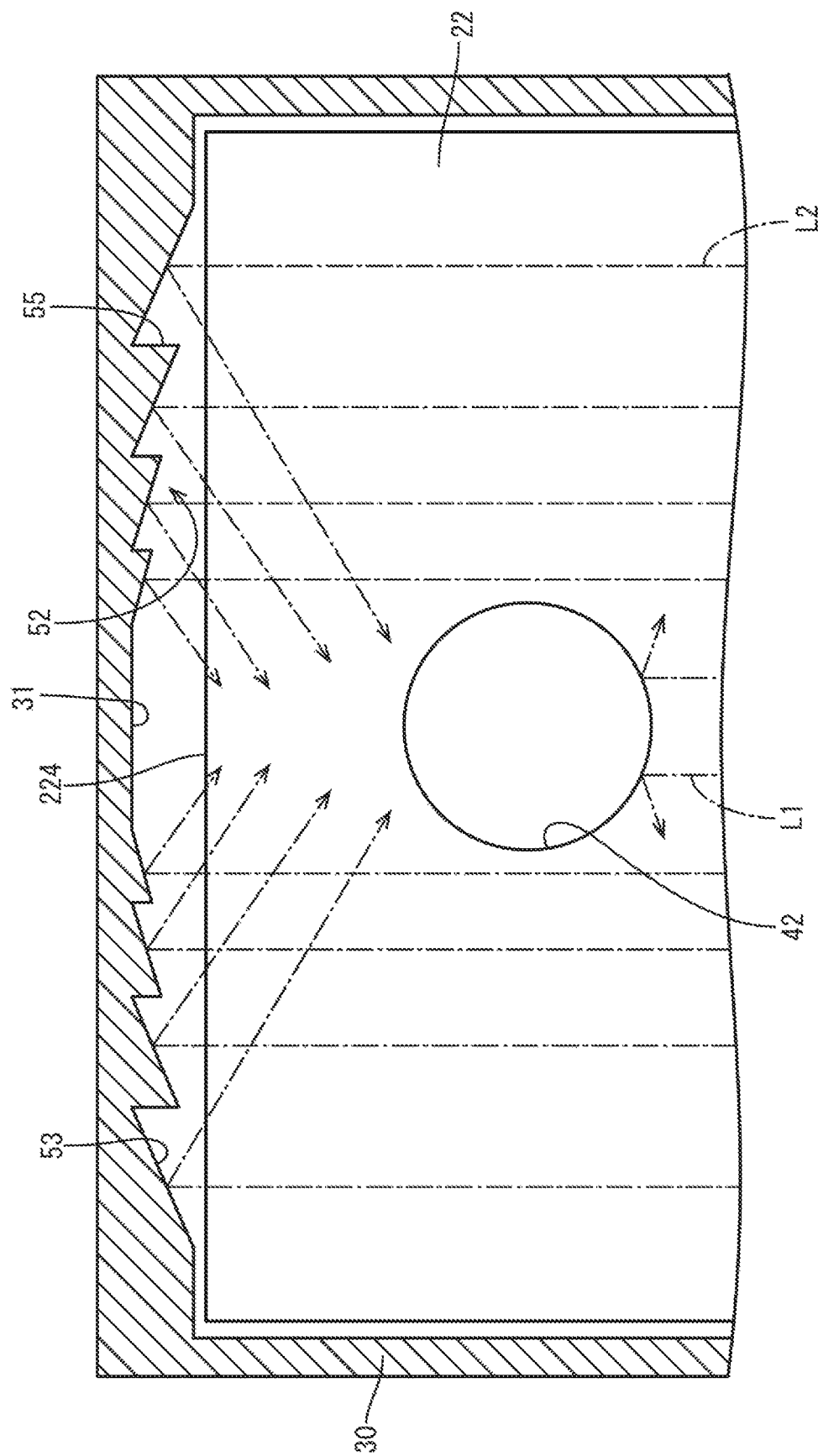
FIG. 7 is an enlarged diagrammatical view of an opposite end face of a light guide plate according to a second embodiment.

FIG. 7 is an enlarged diagrammatical view of the opposite end face 224 of the backlight unit 20 according to a second embodiment. The backlight unit 20 according to the second embodiment is different from the backlight unit 20 according to the first embodiment in that the light reflection portion 50 is formed on the frame 30. In the first embodiment, the light reflection portion is formed on the opposite end face 224. In the second embodiment, on the other hand, the light reflection portion is formed on the frame 30 adjacent to the opposite end face 224. In this manner, the light reflection portion can be formed not only on the opposite end face 224 but also on the frame 30, which is included in the adjacent area adjacent to the opposite end face 224.

As shown in FIG. 7, frame light reflection portions 52 of a serrated shape in a plan view are formed on an inner surface 31 of the frame 30. This inner surface 31 is adjacent to the opposite end face 224 and is opposite to the light sources 21, and serves as a surface on which light emitted from the light sources 21 and guided by the light guide plate 22 is incident. The frame light reflection portions 52 have their respective reflection surfaces 53 that reflect light L2 from the light sources 21 toward the area 70 between the unit through-hole 42 and the opposite end face 224, and respective surfaces 55 extending vertically relative to the opposite end face 224 of the light guide plate 22.

In the same manner as in the first embodiment, the number and location of the frame light reflection portions 52 and the sizes and angles of the reflection surfaces 53 are determined properly according to the size and location of the unit through-hole 42 and the number of the light sources 21.

In this manner, light L2 propagating to an area around the unit through-hole 42 is reflected by the reflection surfaces 53 of the frame light reflection portions 52 to cause light L2 to proceed to the area 70 between the unit through-hole 42 and the opposite end face 224. As a result, light L2 reflected by the reflection surfaces 53 propagates to the area 70, thereby illuminates the area 70, to which light L1 emitted from the light sources 21 hardly propagates. Hence, the luminance of the area 70 is increased to the same level as the level of luminance of an area other than the area 70. This reduces luminance irregularity.

When the frame 30 is provided as a black frame or the like that absorbs light, the reflection surfaces 53 are coated with a reflective material (reflective member) with high reflectance, such as a reflection sheet and white paint. This prevents the reflection surfaces 53 from absorbing light L2.

In some cases, light L2 reflected by the reflection surfaces 53 toward the opposite end face 224 is reflected or refracted on the surface of the opposite end face 224. In such a case, the number and location of the frame light reflection portions 52 and the sizes and angles of the reflection surfaces 53 should be determined properly as light L2 being reflected or refracted on the surface of the opposite end face 224 is taken into consideration. If the surface of the opposite end face 224 is roughened, light L2 is hardly reflected on such a roughened surface of the opposite end face 224.

The liquid crystal display device having the circular through-hole has been described in the second embodiment. As in the first embodiment, the unit through-hole is not limited in shape and number. The opposite end face 224 is not limited in shape. As in the first embodiment, the opposite end face 224 may include a curved surface or part.

(Modification C)

Figure 8:
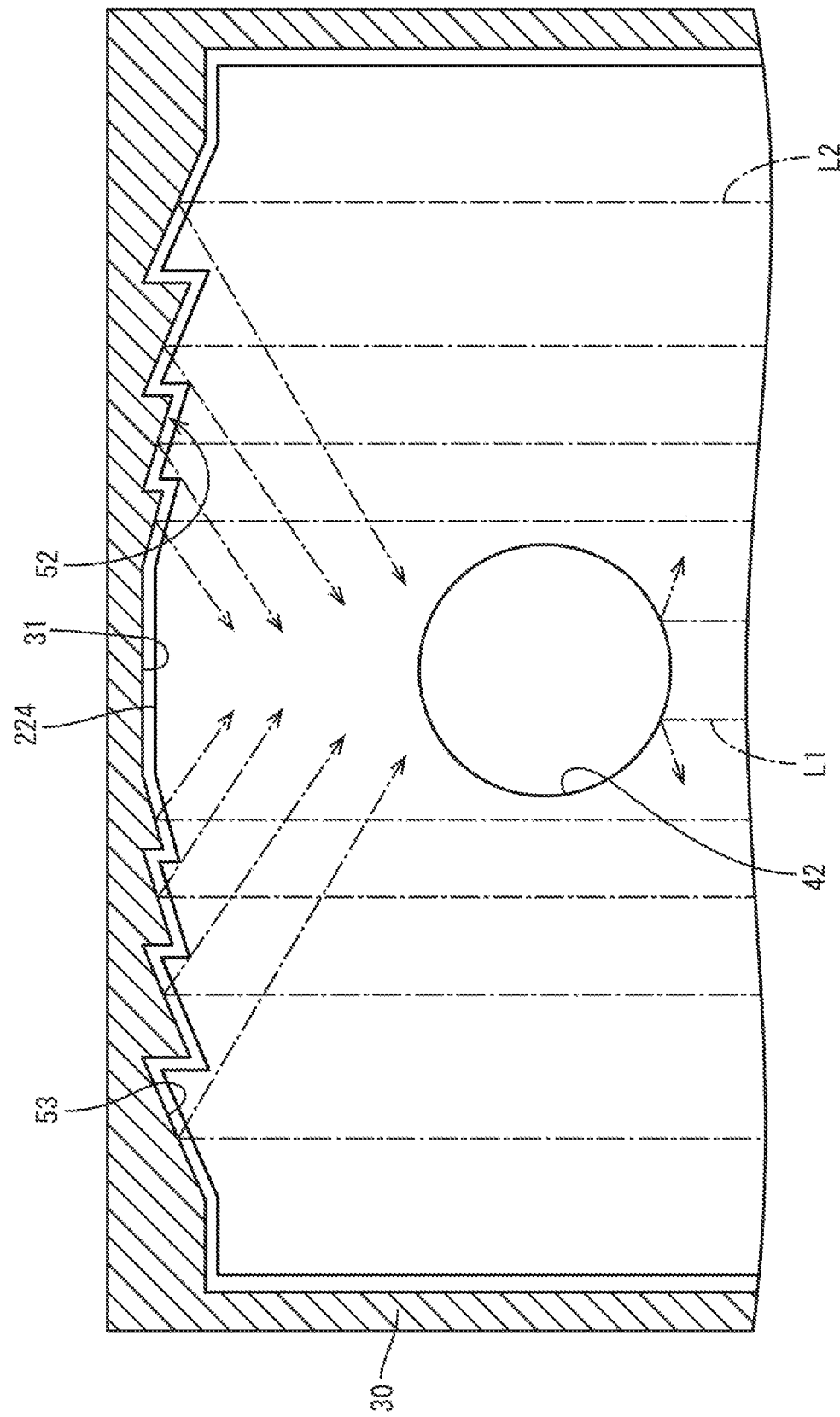
FIG. 8 is a diagrammatical view of a modification C of the second embodiment.
Figure 9:
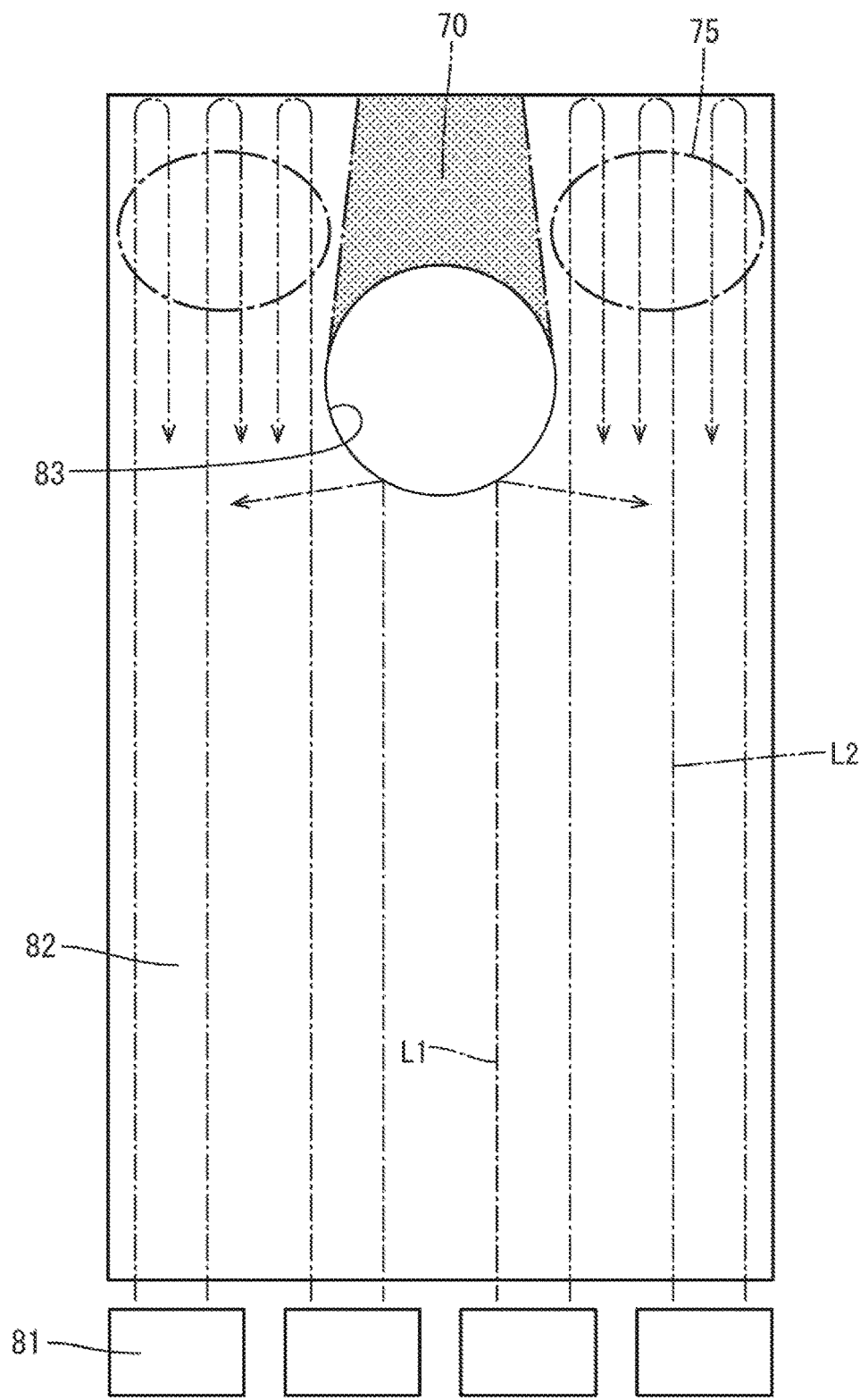
FIG. 9 is an explanatory view diagrammatically showing a state of propagation of light emitted from light sources in a backlight having a through-hole.

FIG. 8 is an enlarged diagrammatical view of the opposite end face 224 of the backlight unit 20 according to a modification C of the second embodiment.

As shown in FIG. 8, the shape of the opposite end face 224 of the light guide plate 22 is matched to the shape of the inner surface 31 of the frame 30.

A liquid crystal display device configured in this manner is provided with the frame light reflection portions 52 formed properly to reflect light L2 toward the area 70 between the unit through-hole 42 and the opposite end face 224. This allows the liquid crystal display device of the modification C to offer the same effects as offered by the liquid crystal display device according to the first embodiment. This configuration eliminates a space between the opposite end face 224 and the inner surface 31 of the frame 30. As a result, a problem caused by foreign matter entering the space can be prevented.

In the first embodiment, the shape of the inner surface 31 of the frame 30 may be matched to the shape of the opposite end face 224 of the light guide plate 22 in the same manner as in the modification C. In this case, as in the modification C, a problem caused by foreign matter entering the space between the opposite end face 224 and the inner surface 31 of the frame 30 can be prevented.

The technology described herein is not limited to the above embodiments, and may be modified into various forms of applications within the scope indicated in claims. An embodiment achieved combining technical means disclosed respectively in different embodiments is also in the technical scope of the technology described herein. Furthermore, combining technical means disclosed respectively in embodiments leads to creation of a new technical feature.

The light reflection portion is applicable if it is disposed at a location closer to the opposite end face 224 of the light guide plate 22 than the unit through-hole 42, the location including a location outside the opposite end face 224 (location further distant from the unit through-hole 42). In other words, the light reflection portion is applicable if it is disposed at a location opposite to the light sources 21 with respect to the unit through-hole 42. For example, a part of the light guide plate 22 may be processed to form the light reflection portion at a location between the unit through-hole 42 of the light guide plate 22 and the opposite end face 224.

The invention claimed is:

1. A display device comprising:
   a display element having a display area;
   a light source; and
   a light guide element including:
      a light incident surface that is an end face facing the light source, the end face receiving incoming light from the light source;
      an opposite end face located opposite to the light incident surface;
      a light exit surface that is a plate surface through which the light exits toward the display element; and
      an opposite plate surface located opposite to the light exit surface, wherein
   the light guide element has a through-hole penetrating the light guide element from the light exit surface to the opposite plate surface, the through-hole is formed at a location corresponding to a location of the display area, and
   the display device further includes a light portion in an adjacent area adjacent to the opposite end face, the light reflection portion having a reflection surface that is serrated in a plan view and reflects light guided by the light guide element to the opposite end face toward the through-hole.

2. The display device according to claim 1, wherein the light reflection portion is formed on the opposite end face.

3. The display device according to claim 1, further comprising a frame in which the light source and the light guide element are housed,
   wherein the light reflection portion is formed on the frame.

4. The display device according to claim 3, wherein the opposite end face has a roughened surface.

5. The display device according to claim 1, wherein the reflection surface is coated with a reflective member.

6. The display device according to claim 1, wherein the light guide element has the light incident surface as one surface.

7. The display device according to claim 1, wherein the display element has a hole formed at a location corresponding to a location of the through-hole.

* * * * *